United States Patent
Esposito et al.

(10) Patent No.: US 11,434,830 B2
(45) Date of Patent: Sep. 6, 2022

(54) CONTROL SYSTEM AND METHOD FOR A TURBOPROPELLER ENGINE BASED ON INLET TEMPERATURE SENSING

(71) Applicant: GE Avio S.r.l., Rivalta di Torino (IT)

(72) Inventors: Aniello Esposito, Sant'Ambrogio di Torino (IT); Giuseppe Donini, Villanova d'Asti (IT)

(73) Assignee: GE AVIO S.R.L., Rivalta di Torino (IT)

( * ) Notice: Subject to any disclaimer, the term of this patent is extended or adjusted under 35 U.S.C. 154(b) by 0 days.

(21) Appl. No.: 17/054,682

(22) PCT Filed: Jun. 18, 2019

(86) PCT No.: PCT/EP2019/066098
§ 371 (c)(1),
(2) Date: Nov. 11, 2020

(87) PCT Pub. No.: WO2019/243371
PCT Pub. Date: Dec. 26, 2019

(65) Prior Publication Data
US 2021/0102501 A1    Apr. 8, 2021

(30) Foreign Application Priority Data

Jun. 18, 2018 (EP) .................................. 18425044

(51) Int. Cl.
*F02C 9/20* (2006.01)
*F02C 6/20* (2006.01)
(Continued)

(52) U.S. Cl.
CPC ............... *F02C 9/20* (2013.01); *F02C 6/206* (2013.01); *F02C 9/28* (2013.01); *F04D 27/0246* (2013.01);
(Continued)

(58) Field of Classification Search
CPC ..... G01K 7/42; F02C 9/20; F02C 9/28; F02C 6/206; F04D 27/0246; F05D 2270/313
See application file for complete search history.

(56) References Cited

U.S. PATENT DOCUMENTS 2,632,996 A * 3/1953 Rood ........................ F02C 9/28
                                                      374/144
2,737,252 A    3/1956 Knapp et al.
(Continued)

FOREIGN PATENT DOCUMENTS

GB       2194357 A     3/1988

OTHER PUBLICATIONS

EP Search Report Corresponding to EP18425044 dated Nov. 28, 2018.
PCT ISR Corresponding to PCT/EP2019/066098 dated Jun. 12, 2019.

*Primary Examiner* — Jason H Duger
(74) *Attorney, Agent, or Firm* — Dority & Manning, P.A.

(57) ABSTRACT

A control system (50) for a turbopropeller engine (2) of an aircraft (1) having a gas turbine (11) and a propeller assembly (3) coupled to the gas turbine (11), the gas turbine (11) having a compressor (12) coupled to an air intake (13) and a temperature sensor (22) being arranged in the air intake (13) to measure the temperature of engine intake air and provide a sensed temperature ($T1_{sens}$); the control system envisages: a compensation system (40) to receive the sensed temperature ($T1_{sens}$) from the temperature sensor (22) and to add to the sensed temperature ($T1_{sens}$) a compensation quantity (comp) to compensate for a delay introduced by the time constant ($\tau$) of the temperature sensor (22) and generate a compensated temperature ($T1_{comp}$); and a control unit (20) to perform engine control operations based on the compensated temperature ($T1_{comp}$). In particular, the compensation quantity (comp) is calculated based on an ISA International (Continued)

Standard Atmosphere—temperature ($T1_{ISA}$), which is determined as a function of an external pressure (P0) measured by a pressure sensor (35).

18 Claims, 6 Drawing Sheets

(51) Int. Cl.
*F02C 9/28* (2006.01)
*F04D 27/02* (2006.01)
(52) U.S. Cl.
CPC .. *F05D 2220/323* (2013.01); *F05D 2270/313* (2013.01)

(56) References Cited

U.S. PATENT DOCUMENTS

| | | | | |
|---|---|---|---|---|
| 3,999,373 A | * | 12/1976 | Bell, III | F02C 9/32 60/791 |
| 4,594,849 A | * | 6/1986 | Kenison | F02C 9/28 701/100 |
| 4,772,179 A | | 9/1988 | Bennett et al. | |
| 5,080,496 A | * | 1/1992 | Keim | F02C 9/28 374/E7.042 |
| 5,636,507 A | | 6/1997 | Rajamani et al. | |
| 9,562,479 B2 | * | 2/2017 | Chen | F02C 9/00 |
| 10,473,038 B2 | * | 11/2019 | Morgan | F02C 3/04 |

* cited by examiner

ISA TABLE

| ALTITUDE (Feet) | TEMP. (°C) | PRESSURE | | | PRESSURE RATIO $\delta = P/P_0$ | DENSITY $\sigma = \rho/\rho_0$ | Speed of sound (kt) | ALTITUDE (meters) |
|---|---|---|---|---|---|---|---|---|
| | | hPa | PSI | In.Hg | | | | |
| 40 000 | - 56.5 | 188 | 2.72 | 5.54 | 0.1851 | 0.2462 | 573 | 12 192 |
| 39 000 | - 56.5 | 197 | 2.58 | 5.81 | 0.1942 | 0.2583 | 573 | 11 887 |
| 38 000 | - 56.5 | 206 | 2.99 | 6.10 | 0.2038 | 0.2710 | 573 | 11 582 |
| 37 000 | - 56.5 | 217 | 3.14 | 6.40 | 0.2138 | 0.2844 | 573 | 11 278 |
| 36 000 | - 56.3 | 227 | 3.30 | 6.71 | 0.2243 | 0.2981 | 573 | 10 973 |
| 35 000 | - 54.3 | 238 | 3.46 | 7.04 | 0.2353 | 0.3099 | 576 | 10 668 |
| 34 000 | - 52.4 | 250 | 3.63 | 7.38 | 0.2467 | 0.3220 | 579 | 10 363 |
| 33 000 | - 50.4 | 262 | 3.80 | 7.74 | 0.2586 | 0.3345 | 581 | 10 058 |
| 32 000 | - 48.4 | 274 | 3.98 | 8.11 | 0.2709 | 0.3473 | 584 | 9 754 |
| 31 000 | - 46.4 | 287 | 4.17 | 8.49 | 0.2837 | 0.3605 | 586 | 9 449 |
| 30 000 | - 44.4 | 301 | 4.36 | 8.89 | 0.2970 | 0.3741 | 589 | 9 144 |
| 29 000 | - 42.5 | 315 | 4.57 | 9.30 | 0.3107 | 0.3881 | 591 | 8 839 |
| 28 000 | - 40.5 | 329 | 4.78 | 9.73 | 0.3250 | 0.4025 | 594 | 8 534 |
| 27 000 | - 38.5 | 344 | 4.99 | 10.17 | 0.3398 | 0.4173 | 597 | 8 230 |
| 26 000 | - 36.5 | 360 | 5.22 | 10.63 | 0.3552 | 0.4325 | 599 | 7 925 |
| 25 000 | - 34.5 | 376 | 5.45 | 11.10 | 0.3711 | 0.4481 | 602 | 7 620 |
| 24 000 | - 32.5 | 393 | 5.70 | 11.60 | 0.3876 | 0.4642 | 604 | 7 315 |
| 23 000 | - 30.6 | 410 | 5.95 | 12.11 | 0.4046 | 0.4806 | 607 | 7 010 |
| 22 000 | - 28.6 | 428 | 6.21 | 12.64 | 0.4223 | 0.4976 | 609 | 6 706 |
| 21 000 | - 26.6 | 446 | 6.47 | 13.18 | 0.4406 | 0.5150 | 611 | 6 401 |
| 20 000 | - 24.6 | 466 | 6.75 | 13.75 | 0.4595 | 0.5328 | 614 | 6 096 |
| 19 000 | - 22.6 | 485 | 7.04 | 14.34 | 0.4791 | 0.5511 | 616 | 5 791 |
| 18 000 | - 20.7 | 506 | 7.34 | 14.94 | 0.4994 | 0.5699 | 619 | 5 406 |
| 17 000 | - 18.7 | 527 | 7.65 | 15.57 | 0.5203 | 0.5892 | 621 | 5 182 |
| 16 000 | - 16.7 | 549 | 7.97 | 16.22 | 0.5420 | 0.6090 | 624 | 4 877 |
| 15 000 | - 14.7 | 572 | 8.29 | 16.89 | 0.5643 | 0.6292 | 626 | 4 572 |
| 14 000 | - 12.7 | 595 | 8.63 | 17.58 | 0.5875 | 0.6500 | 628 | 4 267 |
| 13 000 | - 10.8 | 619 | 8.99 | 18.29 | 0.6113 | 0.6713 | 631 | 3 962 |
| 12 000 | - 8.8 | 644 | 9.35 | 19.03 | 0.6360 | 0.6932 | 633 | 3 658 |
| 11 000 | - 6.8 | 670 | 9.72 | 19.79 | 0.6614 | 0.7156 | 636 | 3 353 |
| 10 000 | - 4.8 | 697 | 10.10 | 20.58 | 0.6877 | 0.7385 | 638 | 3 048 |
| 9 000 | - 2.8 | 724 | 10.51 | 21.39 | 0.7148 | 0.7620 | 640 | 2 743 |
| 8 000 | - 0.8 | 753 | 10.92 | 22.22 | 0.7428 | 0.7860 | 643 | 2 438 |
| 7 000 | + 1.1 | 782 | 11.34 | 23.09 | 0.7716 | 0.8106 | 645 | 2 134 |
| 6 000 | + 3.1 | 812 | 11.78 | 23.98 | 0.8014 | 0.8359 | 647 | 1 829 |
| 5 000 | + 5.1 | 843 | 12.23 | 24.90 | 0.8320 | 0.8617 | 650 | 1 524 |
| 4 000 | + 7.1 | 875 | 12.69 | 25.84 | 0.8637 | 0.8881 | 652 | 1 219 |
| 3 000 | + 9.1 | 908 | 13.17 | 26.82 | 0.8962 | 0.9151 | 654 | 914 |
| 2 000 | + 11.0 | 942 | 13.67 | 27.82 | 0.9298 | 0.9428 | 656 | 610 |
| 1 000 | + 13.0 | 977 | 14.17 | 28.86 | 0.9644 | 0.9711 | 659 | 305 |
| 0 | + 15.0 | 1013 | 14.70 | 29.92 | 1.0000 | 1.0000 | 661 | 0 |
| - 1 000 | + 17.0 | 1050 | 15.23 | 31.02 | 1.0366 | 1.0295 | 664 | - 305 |

FIG.9

CONTROL SYSTEM AND METHOD FOR A TURBOPROPELLER ENGINE BASED ON INLET TEMPERATURE SENSING

The present solution relates to a control system and method for a turbopropeller (or turboprop) engine of an aircraft, based on inlet temperature sensing.

FIG. 1 shows a perspective view of an exemplary aircraft 1, provided with a turbopropeller engine 2; only a propeller assembly 3 of the turbopropeller engine 2 is visible in the same FIG. 1.

The aircraft 1 includes an airframe 4 defining a cockpit 5; a single operator-manipulated input device (a power, or throttle, lever), 6, and an instrument control panel 7 having a display 8 are provided within the cockpit 5.

The propeller assembly 3 comprises a hub 9 and a plurality of blades 10, extending outwardly from the hub 9. A gas turbine of the turbopropeller engine 2 (here not shown) generates and transmits power to drive rotation of propeller assembly 3, thus generating thrust for the aircraft 1.

As schematically shown in FIG. 2, the gas turbine of the turbopropeller engine 2, here denoted with 11, generally comprises:

an axial/centrifugal compressor 12, coupled to an air intake 13;

a high-pressure turbine 14, so called "gas generator", coupled to the axial/centrifugal compressor 12 via a gas generator shaft 15; and a low-pressure turbine 16, so called "power turbine", mechanically decoupled from the gas generator shaft 15 and driven by hot gas expansion.

The propeller assembly 3 is coupled to the gas turbine engine 11 via a propeller shaft 17 and a gearbox 18.

More specifically, the gearbox 18 can include a first gear 18a and a second gear 18b in mesh with the first gear 18a. The first gear 18a can be connected to the propeller shaft 17, in turn coupled to the hub 9 of the propeller assembly 3, and the second gear 18b can be connected to a power turbine shaft 17', in turn coupled to the low-pressure turbine 16. During operation, the gearbox 18 can step-down a rotational speed of the power turbine shaft 17', so that a rotational speed of the propeller shaft 17 can be less than the rotational speed of the power turbine shaft 17'.

An actuation assembly 19 is coupled to the propeller assembly 3, to determine the value of a variable pitch angle of the propeller blades 10.

The turbopropeller engine 2 is managed by an electronic control unit 20 (shown schematically in FIG. 2), that includes an electronic processing unit (e.g. a microprocessor, a microcontroller, or similar processing unit) provided with a non-volatile memory storing suitable software instructions, in order to implement an engine control strategy to meet input power requirements, originated from the operator-manipulated power lever 6. The electronic control unit 20 may define one or more of a full authority digital engine controller (FADEC), an engine control unit (ECU), an electronic engine control (EEC), a propeller electronic control unit (PEC).

The turbopropeller engine 2 further comprises: a temperature sensor 22, which is generally arranged within the air intake 13, in order to sense the temperature of engine intake air (that, during operation, flows over the same temperature sensor 22), and is configured to provide a measure of a sensed temperature $T1_{sens}$.

The sensed temperature $T1_{sens}$ measured by the temperature sensor 22 is relevant to control of the engine operation by the electronic control unit 20; in particular, together with a compressor speed Ng, the sensed temperature $T1_{sens}$ establishes the position of a Variable Stator Vane (VSV) device coupled to the compressor 12. In a known manner, this device has the purpose of "partializing" the air flow to the compressor 12, so as to avoid a stall condition.

FIG. 3 schematically shows the structure and operation of the VSV device, here denoted with 25.

A hydraulic actuator 26, provided with a torque motor, moves a piston 27 back and forth; a mechanical linkage 28 transforms the rectilinear motion of the piston 27 into a circular motion, thereby moving a series of blades 29 of a beta angle β into stator vanes 30 of the compressor 12. The rotation of blades 29 deviates the flow of air in the compressor 12, thus allowing to avoid an excess of air at low speed that would lead to stall of the compressor 12.

The hydraulic actuator 26 is electrically controlled by the electronic control unit 20, in particular by the FADEC, which calculates a beta angular opening (i.e. the value of the beta angle β) according to a corrected compressor speed $Ng_r$. This corrected compressor speed $Ng_r$ is the compressor speed Ng multiplied by a parameter that depends on an inlet temperature T2 (that is proportional to the sensed temperature $T1_{sens}$ measured by temperature sensor 22) based on the following expressions:

$$Ng_r = \frac{Ng}{\sqrt{\theta}}$$

$$\theta = \frac{T2[\text{Kelvin}]}{288.15}$$

$$T2 \cong kT1$$

wherein 288.5K (i.e. 15° C.) is the temperature at ISA (International Standard Atmosphere) condition at sea level.

Since the ambient temperature is inversely proportional to the altitude, during an aircraft descent the ambient temperature will progressively increase (as the altitude decreases), and the engine inlet temperature measurement (the sensed temperature $T1_{sens}$) will correspondingly increase. If the sensed temperature $T1_{sens}$ increases (assuming a constant speed Ng), the corrected speed $Ng_r$ decreases.

As shown in FIG. 4, when the corrected compressor speed $Ng_r$ decreases, the FADEC controls the hydraulic actuator 26 to increase the beta angle β, so as to bring the VSV device 25 in a more closed state and thus increase the stall margin of the compressor 12.

Based on the above, the need is therefore felt for a correct and reliable measure for the sensed temperature $T1_{sens}$, in particular during an aircraft fast descent transient, allowing accurate control of the engine operations.

The aim of the present solution is to provide an improved control solution for a turbopropeller engine, allowing to meet the above need.

According to the present solution, a control system and a control method are therefore provided, as defined in the appended claims.

For a better understanding of the present invention, preferred embodiments thereof are now described, purely as non-limiting examples, with reference to the attached drawings, wherein:

FIG. 9 is a Table according to International Standard Atmosphere (ISA) showing the variation of temperature and pressure at different altitude values;

The present solution stems from the realization, by the Applicant that the temperature sensor 22 may introduce a substantial delay in the temperature sensing, due to the sensor's high time constant τ. For example, the high value of the time constant τ may be due to the sensor construction and/or to the sensor arrangement in the air intake 13 of the turbopropeller engine 2, which may be traversed by a limited flow of air during operation.

Figure 1:
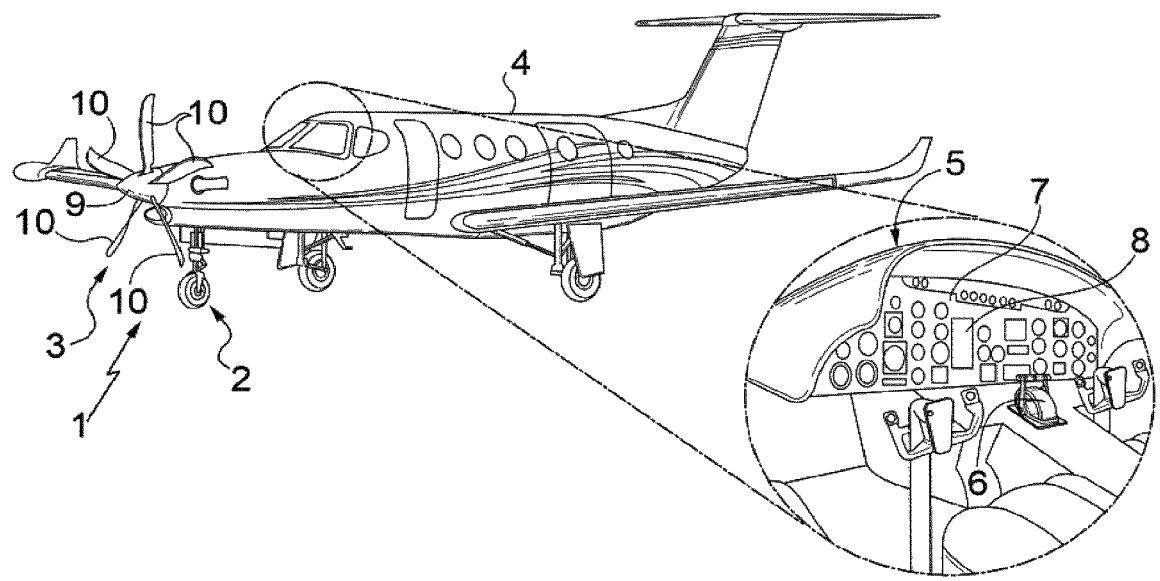
FIG. 1 is a perspective view of an aircraft provided with a turbopropeller engine.
Figure 2:
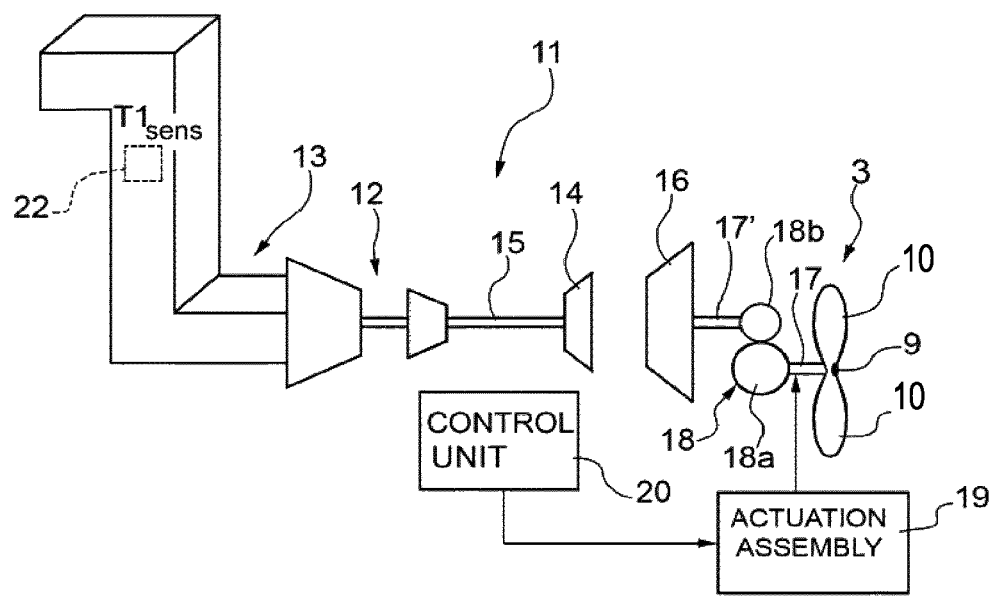
FIG. 2 is a schematic block diagram of the turbopropeller engine of the aircraft.
Figure 3:
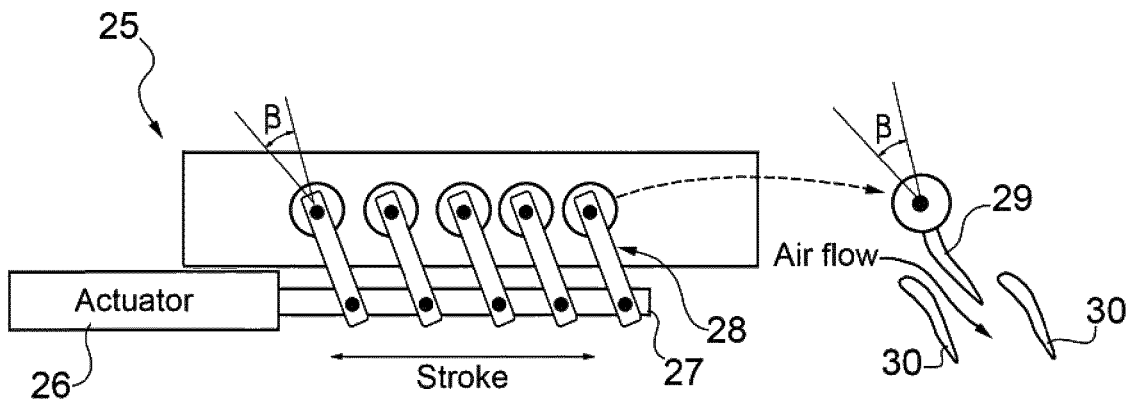
FIG. 3 is a schematic diagram of a Variable Stator Vane (VSV) device of the turbopropeller engine.
Figure 4:
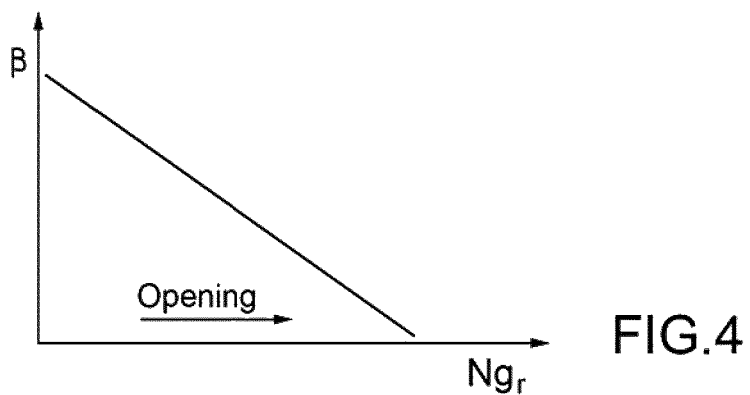
FIG. 4 is a plot of quantities related to operation of the VSV device of FIG. 3.
Figure 5:
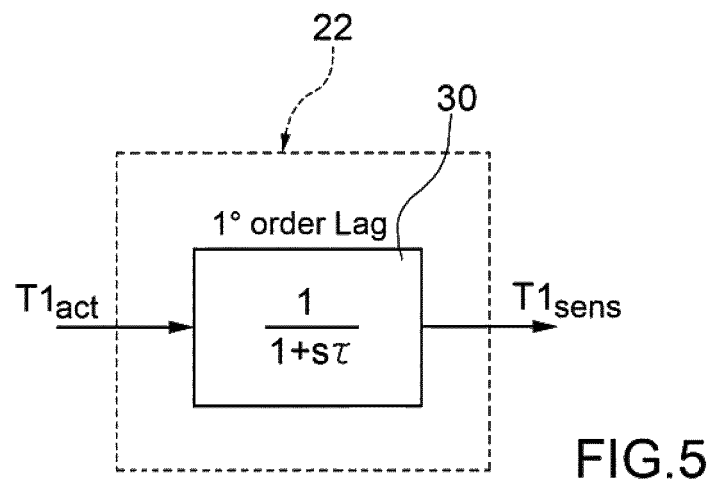
FIG. 5 shows a delay model of an inlet temperature sensor in the turbopropeller engine.

The delay introduced by the sensor time constant τ may be modelled by a first order system, as schematically shown in FIG. 5. In particular, the sensed temperature $T1_{sens}$ is schematically shown as being the result of a first order lag block 30, with transfer function 1/(1+sτ), applied to an actual temperature $T1_{act}$, i.e. the real ambient temperature.

Figure 6A:
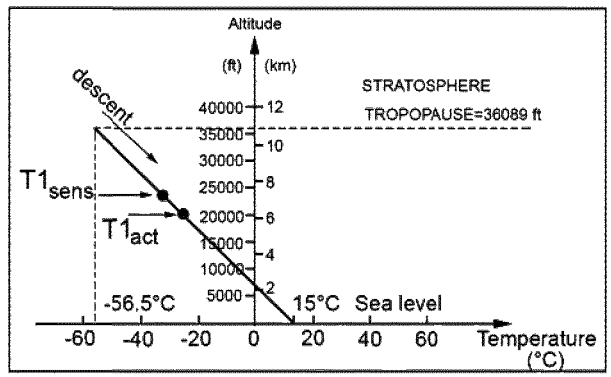
FIGS. 6A-6B show plots highlighting the effects of a delay introduced by the inlet temperature sensor.

As shown in FIG. 6A, during the descent of the aircraft 1, the measure of the sensed temperature $T1_{sens}$ will thus be delayed by the sensor lag and will thus differ from the actual temperature $T1_{act}$, causing a (negative) temperature difference between the sensed temperature $T1_{sens}$ and the actual temperature $T1_{act}$.

Figure 6B:
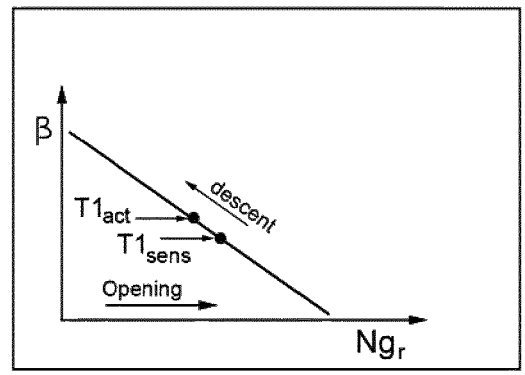

As shown in FIG. 6B, this negative temperature difference will cause the VSV device 25 to track the nominal schedule with an open bias (being more open than required, i.e. being controlled with a lower beta angle β). When the VSV device 25 tracks the more open position, the compressor stability is reduced (the stall margin of the compressor 12 is lower) and an increased risk for compressor stall occurs.

As will be discussed in the following, an aspect of the present solution thus envisages a suitable compensation of the sensed temperature $T1_{sens}$ provided by the temperature sensor 22, in order to compensate for the delay introduced by the same temperature sensor 22.

Figure 7:
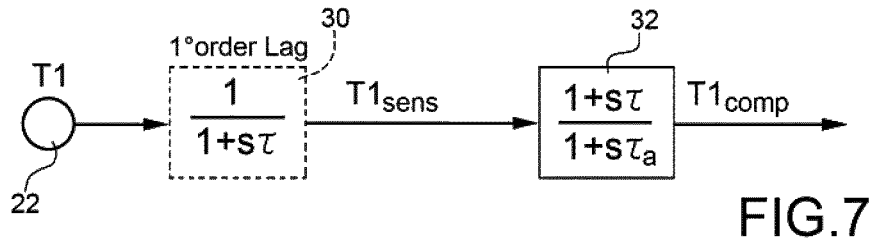
FIG. 7 is a schematic block diagram of a system for direct compensation of the lag introduced by the inlet temperature sensor.

As shown in FIG. 7, a possible compensation solution may envisage a direct compensation of the lag of the temperature sensor 22, by introducing a lead compensator block 32, cascaded to the first order lag block 30 (modelling the same temperature sensor 22, as discussed with reference to FIG. 5), wherein the lead compensator block 32 has a transfer function given by: $(1+s\tau)/(1+s\tau_a)$, $\tau_a$ denoting a lead value.

By a proper choice of the lead value $\tau_a$, it may be possible to achieve a direct compensation of the lag on the sensed temperature $T1_{sens}$, generating a compensated temperature $T1_{comp}$.

The present Applicant, however, has realized that this solution suffers from a drawback due to the high value of the time constant τ, causing an amplification of the little variations introduced by the noise on the sensed temperature $T1_{sens}$, reducing the useful signal.

In particular, if the difference between τ and τa is very high (since the value of the time constant τ is high), the lead compensator block 32 behavior is the same as a derivative block, thus amplifying the noise; this same noise deteriorates the quality of the signal, producing small variations on the VSV command.

Accordingly, an aspect of the present solution envisages the estimation of the delay and the error affecting the measure of the sensed temperature $T1_{sens}$ by the temperature sensor 22, in particular during the aircraft descent, using the measure of a different sensor (as will be discussed in the following, a sensor providing altitude information, in particular a pressure sensor) to produce a suitable compensation quantity.

In particular, assuming that the time constant τ of the temperature sensor 22 is known, it is possible to estimate the delay and the error affecting the temperature measure during the aircraft descent.

In detail, the dynamic error e(s) between the sensed temperature $T1_{sens}$ and the actual temperature $T1_{act}$ can be expressed as:

$$e(s) = T1_{sens}(s) - T1_{act}(s)$$

Considering, as discussed above, the temperature sensor 22 as a first order lag model, the sensed temperature $T1_{sens}$ can be expressed as:

$$T1_{sens}(s) = T1_{act}(s) \frac{1}{1+s\tau}$$

so that the above expression for the error e(s) may be expressed as follows:

$$e(s) = T1_{act}(s) \frac{-s\tau}{1+s\tau} = -s\tau \cdot T1_{act}(s) \frac{1}{1+s\tau}$$

It is possible to estimate the error e(s) in steady state during a constant fast descent, i.e. considering the rate of descent as a constant value A (ramp descent).

Under this assumption, the actual temperature $T1_{act}$ can be expressed, in the time domain, as:

$$T1_{act}(t) = At \cdot u(t)$$

and, in the Laplacian domain, as:

$$T1_{act}(s) = \frac{A}{s^2}$$

Considering the final value theorem:

$$e(\infty) = \lim_{t \to \infty} e(t) = \lim_{s \to 0} se(s) = \lim_{s \to 0} s \frac{A}{s^2} \left[ \frac{-s\tau}{1+s\tau} \right] = -A\tau$$

Accordingly, the steady state error during a descent depends on the rate of descent A and the sensor lag (time constant τ).

Moreover, the rate of descent A can be expressed as:

$$A = \frac{dT1_{act}}{dt}$$

so that the above expression for the steady state error can also be formulated as:

$$e(\infty) = -\frac{dT1_{act}}{dt}\tau.$$

Figure 8:
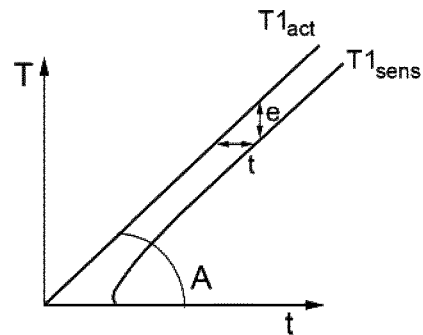
FIG. 8 shows the plots of an actual temperature $T1_{act}$ and of a sensed temperature $T1_{sens}$ during the aircraft descent.

FIG. 8 shows the plots of the actual temperature $T1_{act}$ and of the sensed temperature $T1_{sens}$ during the aircraft descent time, highlighting the lag τ and the error introduced by the temperature sensor 22, according to what has been discussed above.

In order to determine the rate of descent A, the hypothesis can be made that the actual temperature $T1_{act}$ is given by the sum of the temperature calculated by ISA (International Standard Atmosphere) condition, i.e. the ISA temperature $T1_{ISA}$, and an additional value $\Delta T_{day}$, associated to the day condition and that does not depend on the time of descent (in other words, it can reasonably be assumed that this additional value $\Delta T_{day}$ is constant with time and as the altitude decreases):

$$T1_{act}(t) = T1_{ISA}(t) + \Delta T_{day}.$$

The ISA temperature $T1_{ISA}$ indeed increases as the altitude decreases, as shown by the detailed values reported in a Table according to the International Standard, shown in FIG. 9.

From the above expression (and considering that the additional value $\Delta T_{day}$ is constant with time), it follows that:

$$\frac{dT1_{act}}{dt} = \frac{dT1_{ISA}}{dt} = A;$$

$$sT1_{act} = sT1_{ISA} = A.$$

It follows that it is possible to calculate the descent rate A based on the knowledge of the ISA temperature $T1_{ISA}$.

As shown in the same Table of FIG. 9, the ISA temperature $T1_{ISA}$ can be determined based on the altitude value, and the same altitude value can be determined as a function of the external pressure P0.

Figure 10:
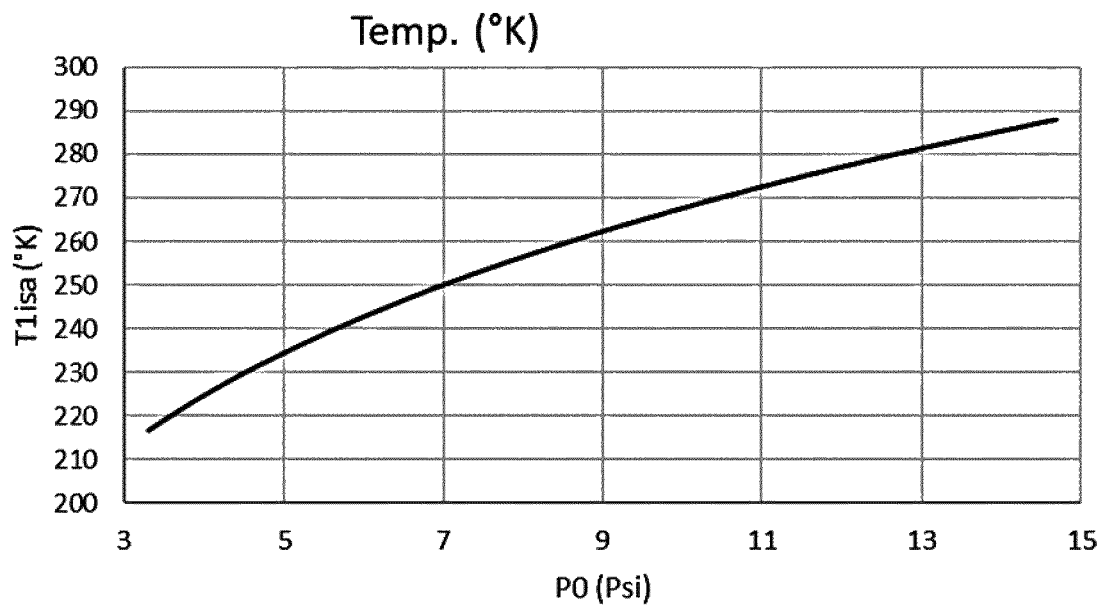
FIG. 10 shows a plot of the ISA temperature $T_{ISA}$ as a function of the external pressure P0.

In this respect, FIG. 10 shows how the ISA temperature $T_{ISA}$ varies as a function of the external pressure P0, according to the values shown in the ISA table of FIG. 9.

The aircraft 1 is provided with a pressure sensor, denoted with 35 in the following (see FIG. 11), that is configured to sense the value of the external pressure P0, i.e. of the pressure in the environment external to the aircraft 1.

The error e(s), given, as discussed above, by the following expression:

$$e(s) = -s\tau \cdot T1_{act}(s)\frac{1}{1+s\tau}$$

can thus be compensated by adding, to the sensed temperature $T_{sens}$, the following compensation quantity comp(s), equal and opposite to the above error expression:

$$comp(s) = s\tau \cdot T1_{ISA}(s)\frac{1}{1+s\tau}$$

wherein the ISA temperature $T_{ISA}$ is determined as a function of the external pressure P0 measured by the pressure sensor 35:

$$T1_{ISA} = f[P0]$$

(it is noted that the equivalence $sT1_{act} = sT1_{ISA}$ has been exploited in the above expression).

In other words, adding the compensation quantity comp(s) to the sensed temperature $T_{sens}$ at the output of the temperature sensor 22 allows to fully compensate the error e(s) (i.e. e(s)=0).

Figure 11:
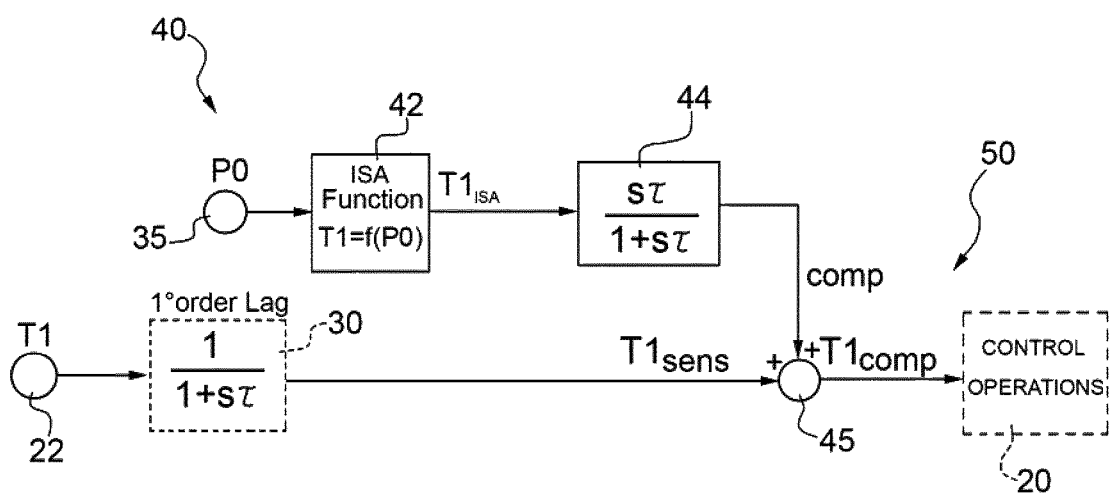
FIG. 11 shows a first embodiment of a compensation system according to the present solution.

FIG. 11 shows a compensation system, denoted with 40, according to a first embodiment of the discussed solution, exploiting the above discussed compensation solution.

The compensation system 40 includes:

a first calculation block 42, which receives at the input altitude information (in the example shown in FIG. 11, this altitude information is represented by the value of the external pressure P0 determined by pressure sensor 35), and calculates the ISA temperature $T1_{ISA}$ at the given altitude, in particular as a function of the external pressure P0, according to the above discussed expression $T1_{ISA} = f[P0]$ (based on the ISA table illustrated in FIG. 9);

a second calculation block 44, coupled to the first calculation block 42, which receives at the input the calculated ISA temperature $T1_{ISA}$ and generates the compensation quantity comp, implementing the transfer function sτ/(1+sτ) (corresponding to a derivative filter);

an adder block 45, having a first adding input coupled to the second calculation block 44 and receiving the compensation quantity comp, a second adding input receiving the sensed temperature $T1_{sens}$ (generated by the first order lag block 30 modelling the temperature sensor 22, with transfer function 1/(1+sτ), starting from the actual temperature $T1_{act}$), and a sum output providing the compensated temperature $T1_{comp}$ (wherein the error e(s) has been compensated).

This compensated temperature $T1_{comp}$, as shown schematically, can then be used by the electronic control unit 20 to implement control operations on the turbopropeller engine 2, such as for controlling the opening/closing state of the VSV device 25 as previously discussed in detail, thereby providing a complete control system 50.

Figure 12:
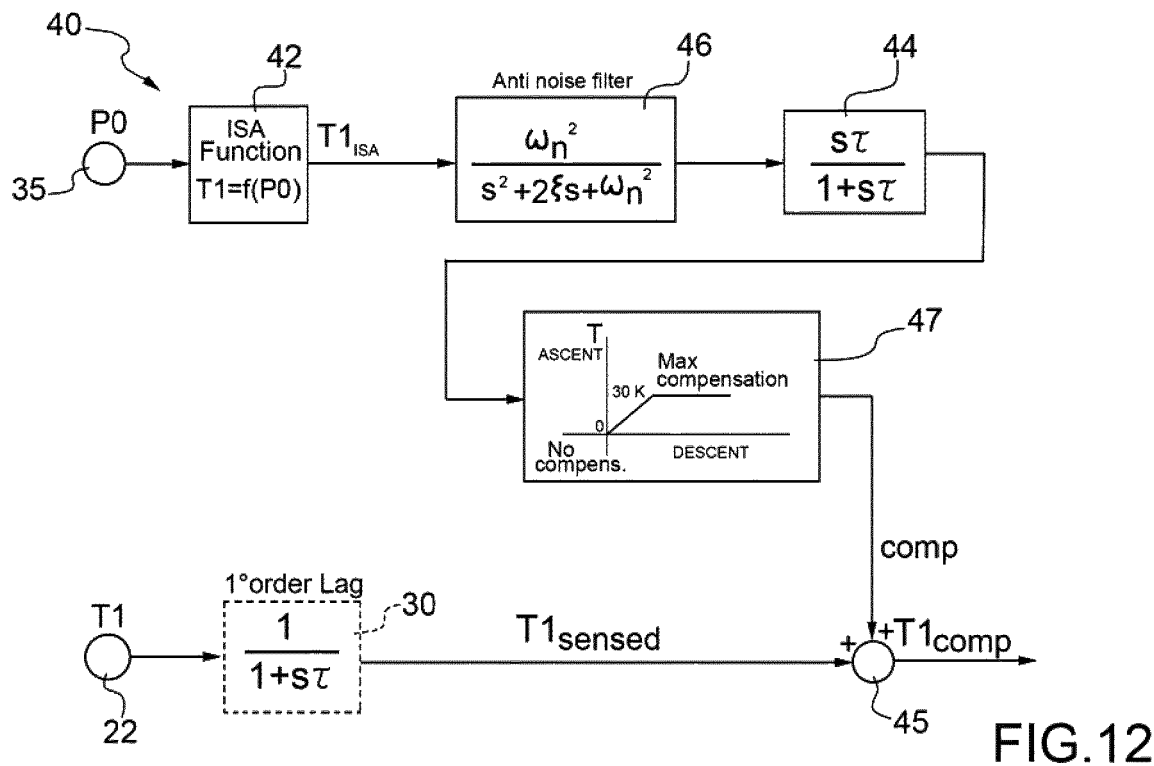
FIG. 12 shows a second embodiment of a compensation system according to the present solution.

FIG. 12 shows a further embodiment for the compensation system, again denoted with 40, which comprises, in addition to what is discussed above in connection with FIG. 11:

an anti-noise filter block 46, in particular a second order low pass filter, inserted between the first calculation block 42 and the second calculation block 44, configured to filter and limit the bandwidth of the signal indicative of the external pressure P0 provided by pressure sensor 35, so as to improve the signal-to-noise ratio and aliasing effect (also considering that, since the rate of descent is not very fast, the bandwidth required for the compensation signal is generally small); and a saturation block 47, at the output of the second calculation block 44, configured to allow the compensation only during a descent of the aircraft 1.

During an ascent, the output of the saturation block 47 (representing the compensation quantity comp for the adder block 45) is always set to a 0 (zero) value, so no compensation is provided; during the descent, the output of the saturation block 47 is limited (saturated) to a saturation value $T1_{sat}$, for example equal to 30K (this value can be tuned depending on the time constant $\tau$), in order to determine a maximum value for the compensation quantity comp and avoid an over compensation.

Figure 13:
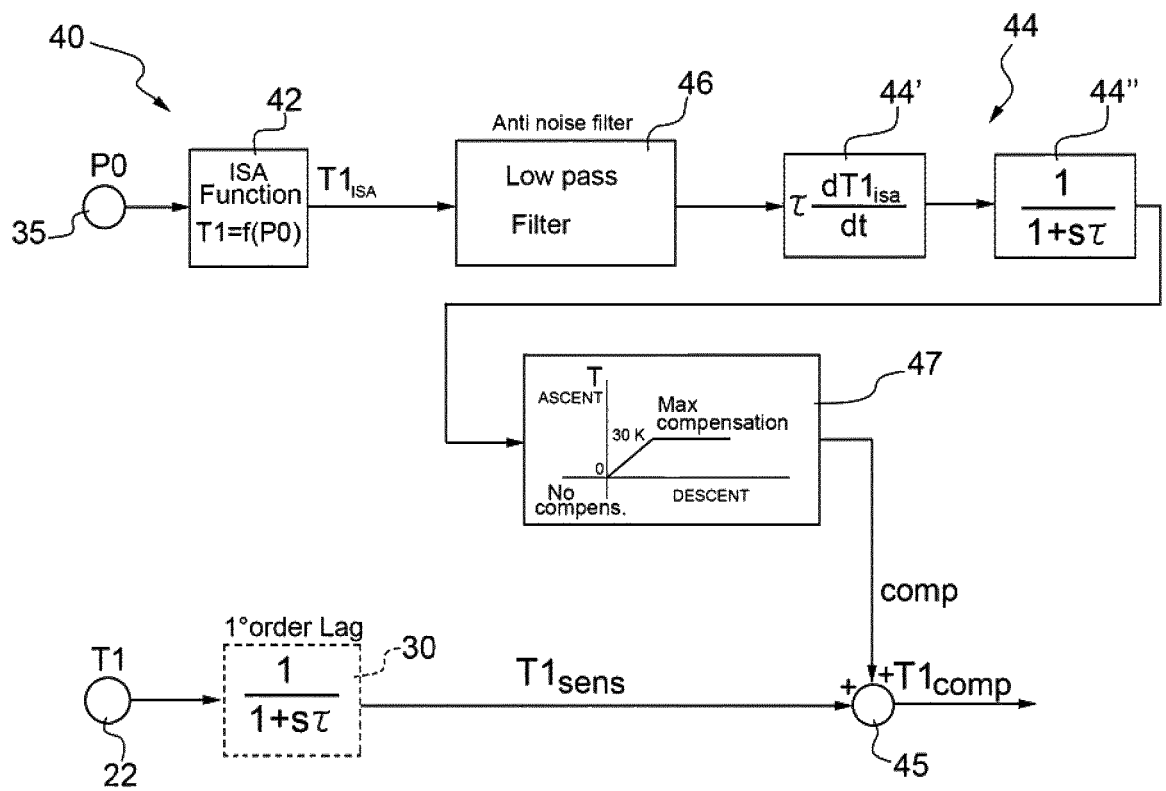
FIG. 13 shows a further representation of the compensation system according to the present solution.

FIG. 13 shows the same compensation system 40, wherein the second calculation block 44 is shown composed of:

a derivative block 44', implementing a derivative function of the ISA temperature $T_{ISA}$, according to the expression $\tau(dT1_{ISA}/dt)$; and a first order lag block 44", implementing a lag function according to the expression $1/(1+s\tau)$.

The advantages of the present solution are clear from the previous discussion.

In any case, it is again underlined that the present solution provides an effective system to compensate for the delay introduced by the temperature sensor 22, allowing to achieve improved engine control operations and reduced operating and maintenance costs.

Advantageously, the disclosed solution exploits altitude information provided by a different sensor to calculate a compensation quantity comp, that is used to compensate for the error on the sensed temperature $T1_{sens}$ measured by the temperature sensor 22 (thus implementing a "sensor fusion" algorithm). In particular, an external pressure sensor 35 is used to calculate the compensation quantity comp, the pressure sensor having a much quicker response (and a much lower time constant) than the temperature sensor 22.

Finally, it is clear that modifications and variations can be made to what is described and illustrated herein, without thereby departing from the scope of the present invention as defined in the appended claims.

In particular, it is underlined that, although generally applied to a fixed-wing aircraft, the present disclosure may further apply to rotary-wing aircraft, tilt-rotor aircraft, or other apparatuses including a pitch-changing propeller assembly and a gas generator coupled to the aircraft.

The invention claimed is:

1. A control system for a turbopropeller engine of an aircraft having a gas turbine and a propeller assembly coupled to the gas turbine, the gas turbine having a compressor coupled to an air intake and a temperature sensor being arranged in the air intake to measure a temperature of engine intake air to provide a sensed temperature, the control system comprising:

a compensation system configured to receive the sensed temperature from the temperature sensor and to add to the sensed temperature a compensation quantity to generate a compensated temperature, the compensation quantity determined based on an International Standard Atmosphere (ISA) temperature and configured to compensate for a delay introduced by a time constant of the temperature sensor; and a control unit configured to perform engine control operations based on the compensated temperature.

2. The system according to claim 1, wherein the compensation system comprises:

a first calculation block configured to receive a signal indicative of aircraft altitude and to calculate the ISA temperature at the corresponding altitude;

a second calculation block coupled to the first calculation block and configured to receive the ISA temperature and to generate the compensation quantity based on the ISA temperature; and an adder block having a first adding input coupled to the second calculation block to receive the compensation quantity, a second adding input coupled to the temperature sensor to receive the sensed temperature, and a sum output configured to provide the compensated temperature.

3. The system according to claim 2, wherein the first calculation block is coupled to a pressure sensor designed to measure an external pressure and is configured to receive the measured external pressure as the signal indicative of aircraft altitude and to calculate the ISA temperature as a function of the external pressure.

4. The system according to claim 2, wherein the second calculation block is configured to implement a transfer function:

$$\frac{s\tau}{(1+s\tau)},$$

wherein $\tau$ is the time constant of the temperature sensor and wherein s is a Laplace operator.

5. The system according to claim 2, wherein the temperature sensor is configured to generate the sensed temperature starting from an actual temperature and implementing a first order lag transfer function:

$$\frac{1}{(1+s\tau)},$$

wherein $\tau$ is the time constant of the temperature sensor and wherein s is a Laplace operator.

6. The system according to claim 2, wherein the compensation system further comprises a saturation block configured to allow compensation only during descent of the aircraft and to set the value of the compensation quantity to zero during ascent of the aircraft.

7. The system according to claim 6, wherein the saturation block is configured to saturate the value of the compensation quantity to a maximum saturation value during the descent of the aircraft.

8. The system according claim 2, further comprising: an anti-noise filter block arranged between the first calculation block and the second calculation block configured to filter and limit bandwidth of the signal indicative of aircraft altitude.

9. The system according to claim 2, wherein the second calculation block comprises:

a derivative block implementing a derivative function of the ISA temperature; and a first order lag block implementing a lag function.

10. The system according to claim 1, wherein the engine control operations performed by the control unit based on the compensated temperature include controlling a variable stator vane device coupled to the compressor to partialize air flowing to the compressor, so as to avoid a stall condition of the compressor.

11. A turbopropeller engine comprising:
the control system according to claim 1,
the gas turbine,
the propeller assembly coupled to the gas turbine, and
the gas turbine having the compressor coupled to the air intake and having the temperature sensor arranged in the air intake to measure the temperature of the engine intake air to provide the sensed temperature.

12. An aircraft comprising the turbopropeller engine according to claim 11.

13. A control method for a turbopropeller engine having a gas turbine and a propeller assembly coupled to the gas turbine, the gas turbine having a compressor coupled to an air intake and a temperature sensor being arranged in the air intake to measure a temperature of engine intake air to provide a sensed temperature, the control method comprising:
receiving the sensed temperature from the temperature sensor;
compensating the sensed temperature, by adding to the sensed temperature a compensation quantity to generate a compensated temperature, the compensation quantity generated based on an International Standard Atmosphere (ISA) temperature and configured to compensate for a delay introduced by a time constant of the temperature sensor; and
performing engine control operations based on the compensated temperature.

14. The method according to claim 13, wherein the compensating the sensed temperature comprises:
receiving a signal indicative of aircraft altitude and calculating the ISA temperature at the corresponding altitude;
and
providing the compensated temperature as the sum between the compensation quantity and the sensed temperature.

15. The method according to claim 14, wherein the receiving the signal indicative of aircraft altitude comprises receiving a measure of an external pressure from a pressure sensor as the signal indicative of aircraft altitude, and wherein the calculating the ISA temperature comprises calculating the ISA temperature as a function of the external pressure.

16. The method according to claim 14, wherein the compensation quantity is generated by implementing a transfer function:

$$\frac{s\tau}{(1+s\tau)},$$

wherein $\tau$ is the time constant of the temperature sensor and wherein s is a Laplace operator.

17. The method according to claim 14, further comprising setting the value of the compensation quantity to zero during ascent of the aircraft.

18. The method according to claim 17, further comprising a saturation block saturating the value of the compensation quantity to a maximum saturation value during descent of the aircraft.

* * * * *